(12) United States Patent
LeFever (10) Patent No.: US 6,298,073 B1
(45) Date of Patent: Oct. 2, 2001

(54) METHOD USING ELASTIC BUFFERING FOR EQUALIZING TRANSMISSION DELAYS IN A NON-EARTH-SYNCHRONOUS MULTIPLE SATELLITE DATA TRANSMISSION SYSTEM

(76) Inventor: Ronald Stanton LeFever, 2040 Spring Valley Rd., Lansdale, PA (US) 19446

(*) Notice: Subject to any disclaimer, the term of this patent is extended or adjusted under 35 U.S.C. 154(b) by 0 days.

(21) Appl. No.: 09/105,863

(22) Filed: Jun. 26, 1998

(51) Int. Cl.[7] .................................................. H04J 3/06
(52) U.S. Cl. ................................... 370/503; 375/372
(58) Field of Search .................................. 370/503, 519, 370/316, 508, 350, 509; 375/372

(56) References Cited

U.S. PATENT DOCUMENTS

| | | | |
|---|---|---|---|
| 3,825,899 | * 7/1974 | Haeberle et al. | 340/172.5 |
| 4,001,690 | * 1/1977 | Mack et al. | 179/15 |
| 4,119,796 | * 10/1978 | Jones | 178/69.1 |
| 4,606,019 | * 8/1986 | Takai . | |
| 4,748,622 | * 5/1988 | Muratani et al. . | |
| 5,077,761 | * 12/1991 | Tokunaga | 375/118 |

* cited by examiner

Primary Examiner—Douglas Olms
Assistant Examiner—Ken Vanderpuye (57) ABSTRACT

A method for fixing the propagation delay between a user terminal and another station in a non-synchronous LEO satellite communications system, to adjust plural signals to have substantially similar times-of-arrival, uses an elastic buffer to insert a variable delay in the received signal processing, so as to cause a fixed time for each data/vocoder bit, from the time that bit enters the transmit modulation process until the time that same data/vocoder bit is output to a user.

20 Claims, 8 Drawing Sheets

METHOD USING ELASTIC BUFFERING FOR EQUALIZING TRANSMISSION DELAYS IN A NON-EARTH-SYNCHRONOUS MULTIPLE SATELLITE DATA TRANSMISSION SYSTEM

The present invention relates to satellite information transmission systems and, more particularly, to a novel method for equalizing the transmission delays from plural satellites in a non-earth-synchronous transmission system having multiple satellite repeaters.

BACKGROUND OF THE INVENTION

It is now well known to provide information transmission via a satellite station repeating incoming data, transmitted from a first station located at a first location at, or near, the surface of the Earth, for reception by another station situated at a second location on, or near, the surface. One such system using a plurality of satellite repeaters has some of the satellites in non-earth-synchronous orbits near to the planet's surface, and is classified as a Low Earth Orbit system with a large number of satellites, sometimes called a "Big LEO"; this system is designed to provide voice, data, fax, and supplementary services to subscribers worldwide. In the system, each user has a User Terminal, or UT, which can be a hand-held, vehicular-movable or fixed-mounted RF terminal transceiver, capable of connection to other User Terminals or to conventional terrestrial-based telephone networks world-wide through system Ground Control Stations (GCSs). Services are provided globally through three satellite orbital planes, two of which are called the "B" sub-constellation, and one called the "C" sub-constellation. The orbits are optimized to provide regional coverage proportional to the distribution of population on the surface of the earth. The B orbits are sun-synchronous, inclined, elliptical orbits, each with 5 satellites, whereas the C orbit is equatorial, circular and has 6 satellites. The distance from any satellite to a particular UT is constantly changing, in a manner different from the change in the distance between any other satellite and that (or another) UT; thus, the propagation time delays between any pair of system stations and locations will be constantly variable and at least one signal will have to be delayed by a variable amount in order for both signals of any pair to be simultaneously presented, as required for proper system operation.

Thus, in this and other non-synchronous satellite communications systems, the propagation delay between a user terminal and a gateway ground station can vary by dozens of milliseconds as a relaying satellite moves relative to both Earth-surface stations. If this time variation is not properly compensated for as it occurs, there will be at least the following three problems: the apparent received data bit rates will vary from the actual transmitted bit rate by several parts per million (perhaps as much as 20 PPM); diversity combination of the signals received from two, or more, different satellites will become more difficult due to the different signal times of arrival; and handoff of the signal from one satellite to another may result in either lost data or a gap between consecutive data portions, with a gap duration substantially equal to the propagation delay difference between the paths through the different satellites.

It is therefore highly desirable to provide a method for elastically (i.e. variably time delay) buffering at least one of a plurality of incident information transmissions to facilitate the required degree of simultaneous application of the plural transmissions in the system.

BRIEF SUMMARY OF THE INVENTION

In accordance with the invention, a method for fixing the propagation delay between the user terminal and another station in a non-synchronous LEO satellite communications system, to adjust plural signals to have substantially similar times-of-arrival, uses an elastic buffer to insert a variable delay in the received signal processing, so as to cause a fixed time for each data/vocoder bit, from the time that bit enters the transmit modulation process until the time that same data/vocoder bit is output to a user.

In a presently preferred embodiment, the variable delay is set to an amount equal to the difference between the maximum possible delay to any user served by a gateway, and the current value of the actual delay to the specific user. This delay will be advantageously inserted between the soft bit decisions produced by a despreading operation and an error-correction-decoding operation in the receiver, for optimal handling of diversity combination problems.

Accordingly, it is an object of the present invention to provide a method for synchronizing plural received signals via an elastic buffer in a LEO satellite information communication system.

This and other objects of the present invention will become apparent upon reading the detailed description of the presently preferred embodiment, when considered in conjunction with the associated drawings, in which like reference numerals are utilized for like elements.

DETAILED DESCRIPTION OF THE INVENTION

Figure 1A:
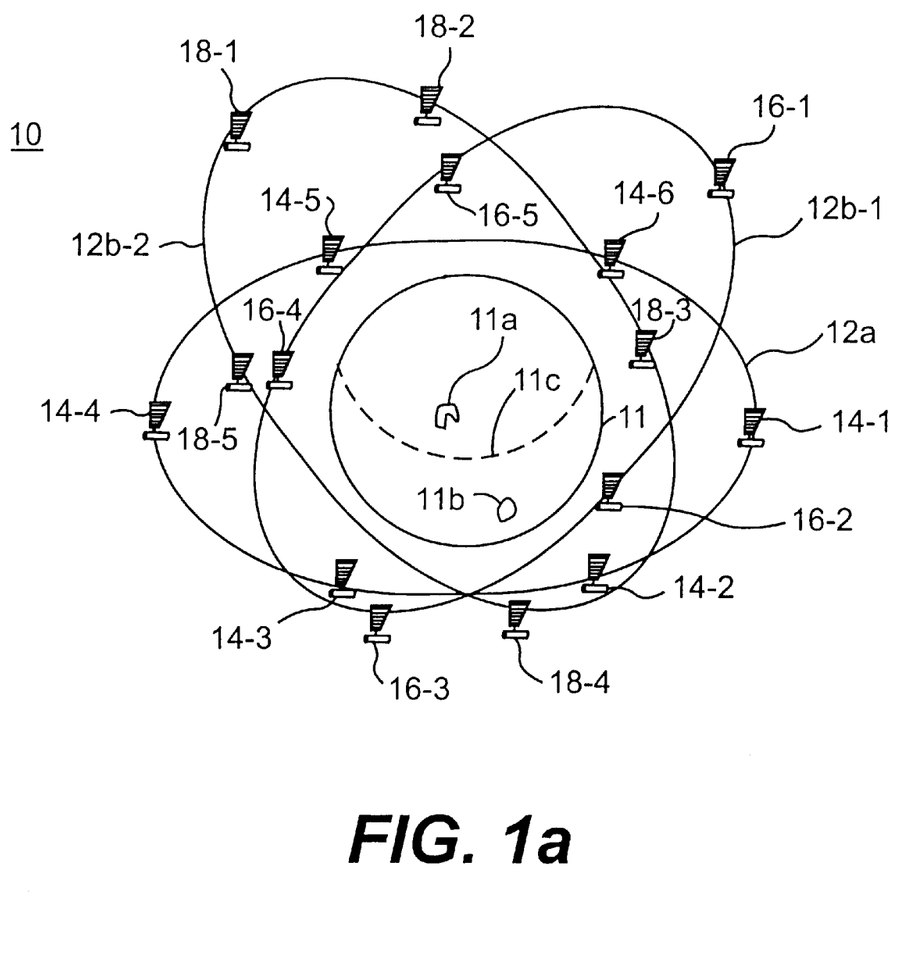
FIG. 1a is a view of the satellites disposed about the Earth in one possible Big LEO system, and, useful in appreciating the present invention.

Referring initially to FIG. 1a, a satellite communications system 10 is provided for communications between a first location 11a anywhere on the Earth 11, and a second location 11b, which can also be anywhere on planet 11. The system provides global communications service through use of a multiplicity of satellites 12 arranged in three satellite orbital planes 12a, 12b-1 and 12b-2. The first plane 12a is a substantially circular, but non-synchronous, orbit about the equator 11e of the planet, and contains a first plurality of satellite relay stations 14 (here, the proposed system has an equatorial C sub-constellation of six relay satellites 14-1 through 14-6). The other two orbital planes 12b-1 and 12b-2, called the B sub-constellation, are each at an angle to equator lie, with orbits optimized to provide regional coverage proportional to the distribution of population on the surface of planet 11. The B orbits are sun-synchronous, inclined, elliptical orbits, each with another plurality 16/18 of satellites (here, each orbit has five satellites 16-1 through 16-5 or 18-1 through 18-5). The satellites 14, 16 or 18, respectively in each respective orbit 12a, 12b-1 or 12b-2 are placed such that they are equidistant from each other in time. The B orbits 12b are intended for coverage over temperate regions while the C orbit 12a covers tropical regions. In one specific configuration, the B orbits 12b each have an apogee over the northern hemisphere to provide prolonged coverage over the more populous regions of the earth. Being a circular orbit 12a, the C orbit apogee and perigee are the same.

Figure 1B:
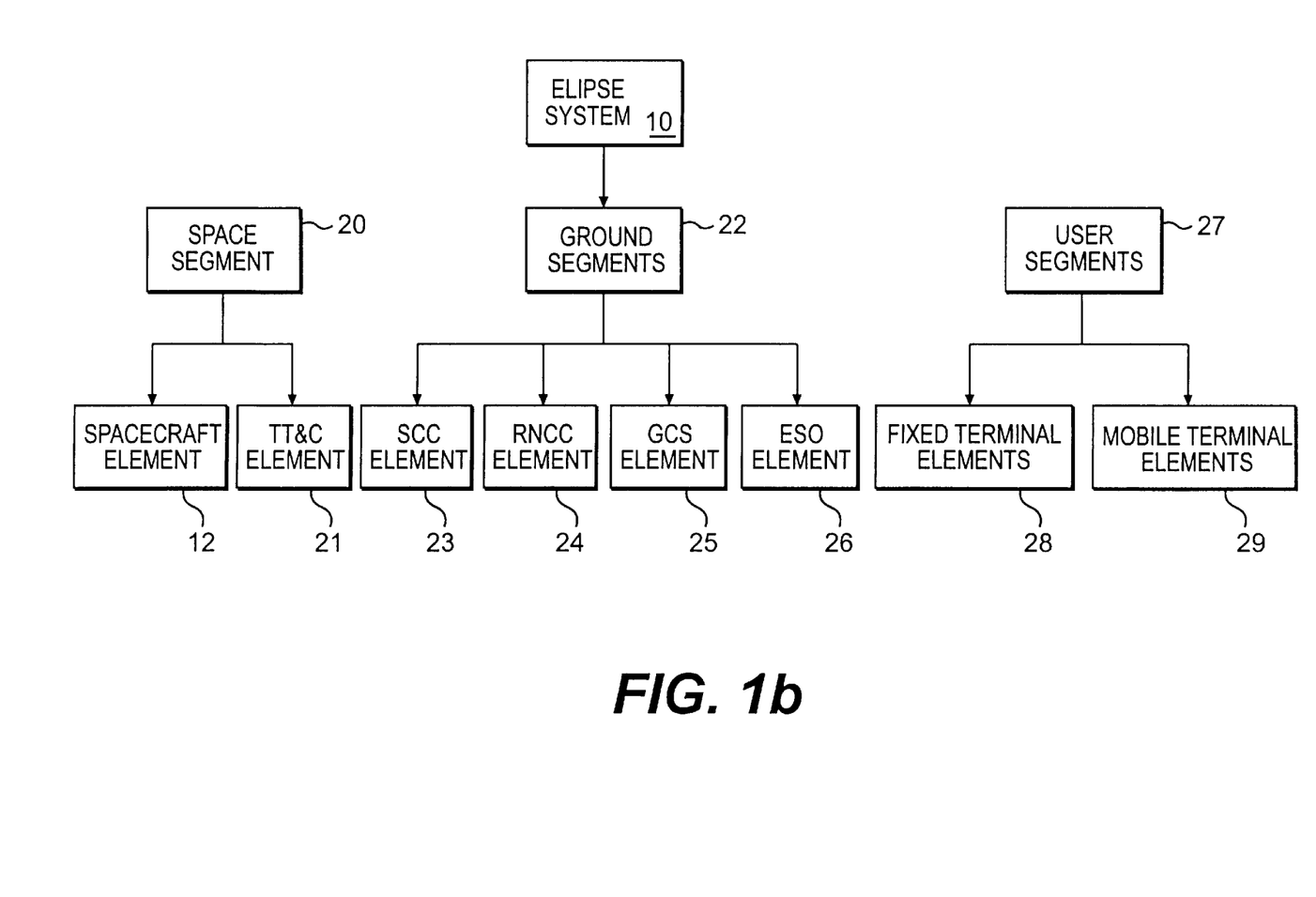
FIG. 1b is a block diagram of one system in which the present invention can be used.
Figure 1C:
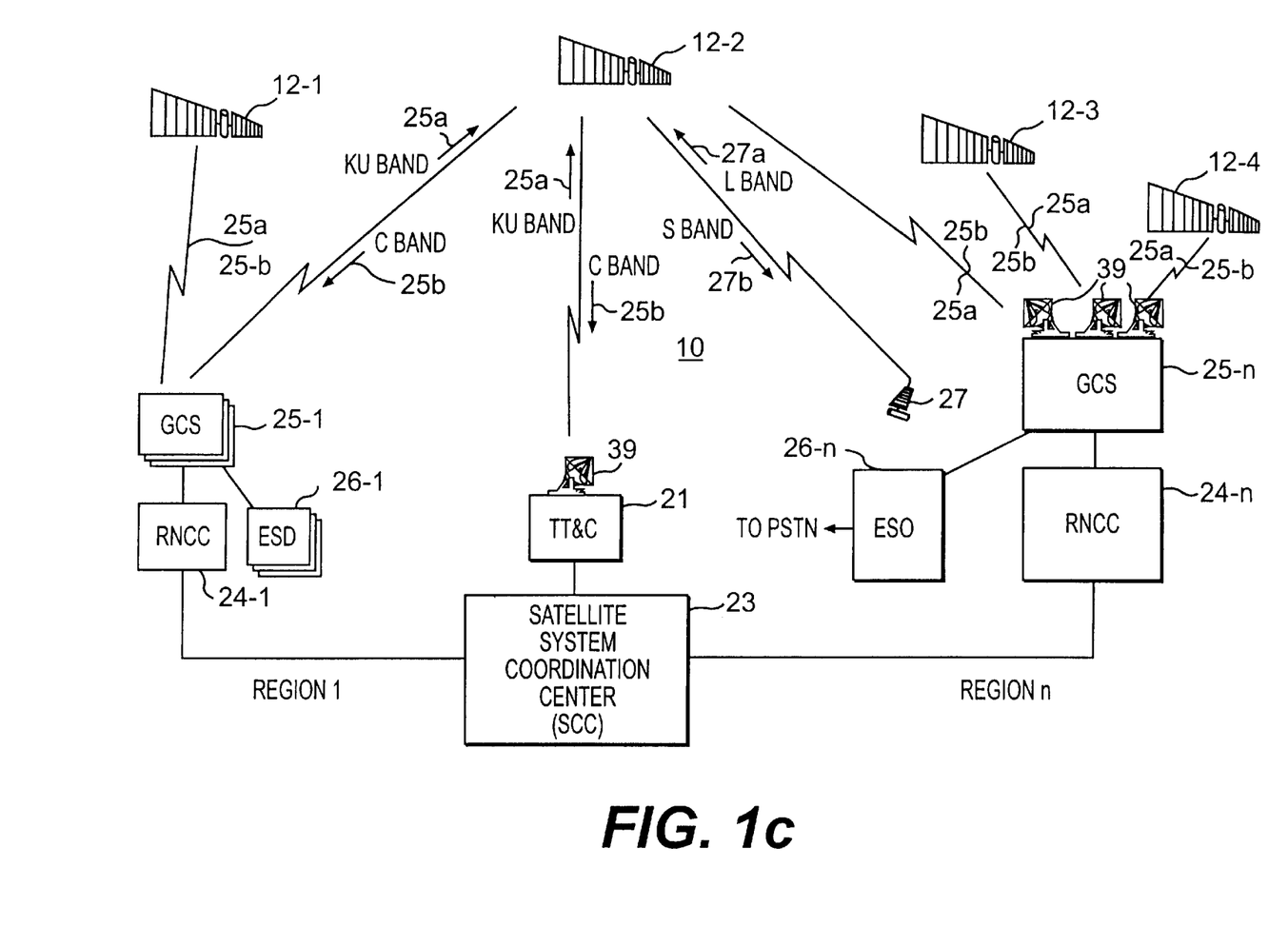
FIG. 1c is another block diagram of a use system, illustrating the problem to be overcome by the present invention.

Referring now to FIGS. 1a–1c, the System 10 architecture is separated into three segments 20/22/27 as shown in the hierarchy of FIG. 1b. The system includes: a space segment 20, which includes the satellites 12 and a single system-wide telemetry, tracking and control (TT&C) station 21 used by the system operator for monitoring and controlling the satellite configuration; a number n of ground segments 22, for which there is a single system coordination center (SCC) 23 and with each i-th one (where $1 \leq i \leq n$) of the n ground segments 22-1 through 22-n having a regional network control center (RNCC) 24-i, at least one ground control station (GCS) 25-i (sometimes denominated as a "gateway"), and at least one equipment switching office (ESO) 26-i; and plural user segments 27, each of which is denominated a User Terminal (UT) and could be a fixed terminal 28 or a mobile terminal 29.

The satellites 12 provide connectivity between the individual User Terminals (UTs) 27 (FIG. 1c) and the ground stations of the network. The satellite payloads use a simple bent-pipe RF signal repeater-type transponder and are not required to perform on-board processing functions in support of the requirements for voice and data communications, messaging, FAX and user geopositioning services; there is no need to process received RF waveforms down to baseband, i.e., bit level.

TT&C 21 is responsible for maintaining the performance of satellites 12 through monitoring and controlling the satellites' functions, and monitors satellite telemetry for health and status data, generates ephemeris for each satellite based on tracking data, commands the satellites, investigates and resolves spacecraft anomalies and provides health and status information on the satellites payloads to the ground segment. The system architecture has one central TT&C, run by the system operator, with multiple individually-owned satellite contact stations.

In this configuration, the UTs 27 use microwave radio frequencies to communicate directly with at least one of the satellites 12; illustratively, L-band frequencies may be used for establishing user uplinks 27a, and S-band frequencies may be used for user downlinks 27b. Similarly, Ku-band frequencies may be used for feeder uplinks 25a between the ground stations 25-i (where $1 \leq i \leq n$, for the n different regions of the system) and satellites 12, and C-band frequencies are used for the feeder downlinks 25b between the satellites and ground stations. The radio links between the satellite and mobile users form a number of satellite spot beams which together cover the region where users require communication services. High system capacity is achieved by frequency re-use across the numerous spot beams (similar to land-based cellular systems). Two-way communication between a user terminal 27 and a Ground Control Station 25 involves a link between the user terminal 27 and a selected satellite 12-2, plus a link between that satellite 12-2 and the selected Ground Control Station 25-i. A mobile-to-mobile call in the illustrated System is achieved by means of a double-hop connection which requires 2 two-way communication links, through an intervening satellite.

In my presently preferred system, there is implemented a CDMA-based air interface for communicating between the user terminals 27 and the Ground Control Stations 25, with a GSM (Global System for Mobile communications)-based architecture, messaging structures and standardized interfaces, wherever possible, for the design of the ground segment 22 subsystems.

Figure 2:
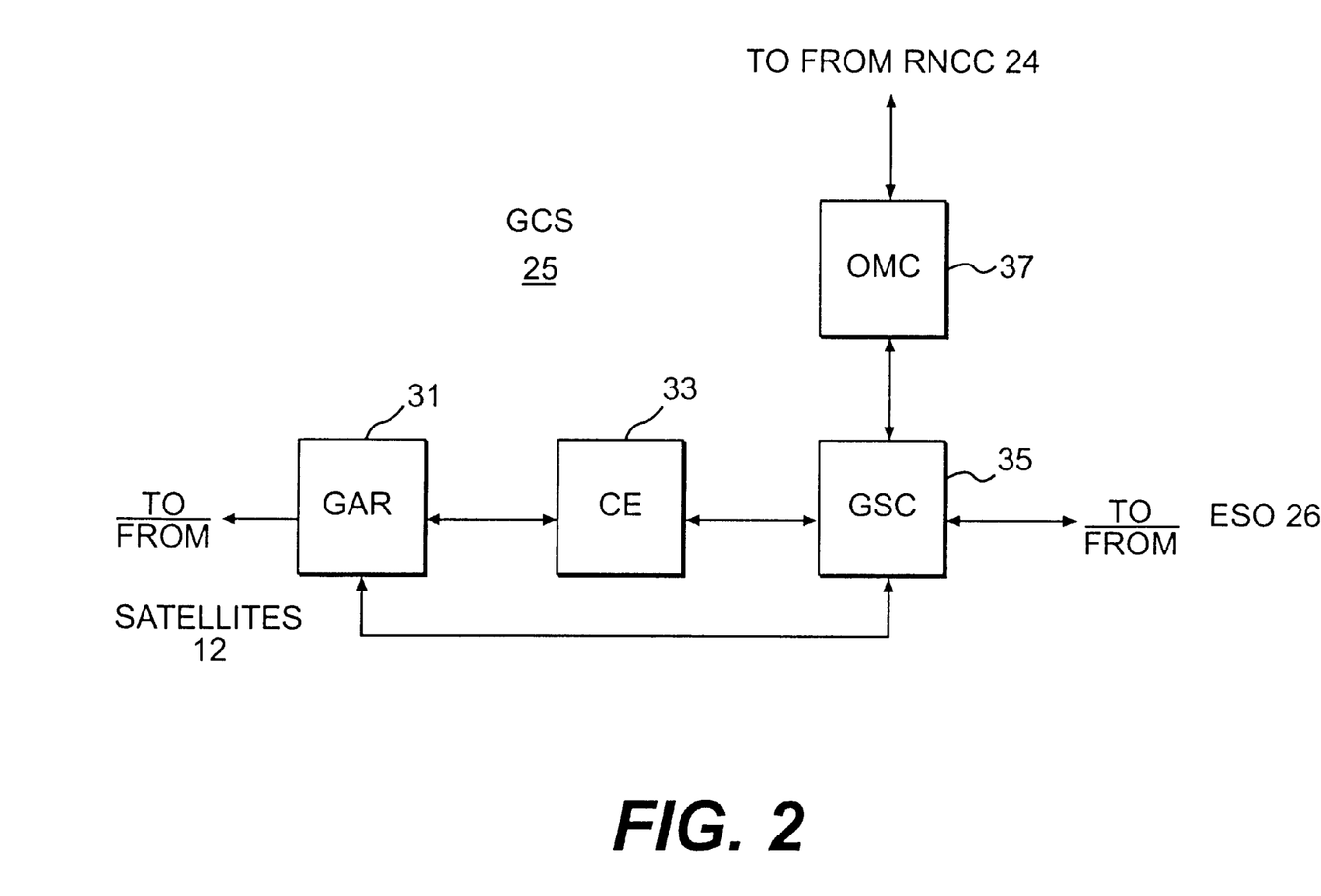
FIG. 2 is a block diagram of a Ground Control Station (GCS) of the system being discussed.

As shown in FIG. 2, a typical Ground Control Station (GCS) 25, for providing connectivity to public and private switched telephone networks through a companion ESO 26, for the purpose of providing telecommunication services to mobile and fixed user terminals, includes the functions required to establish and maintain communication links for telecommunication services between a user terminal 27 and the ground network. This includes the signaling and traffic phases of the call process. In addition, the GCS supports mobility management and location determination of the User Terminal to support position services. The GCS provides trunking circuits to/from the ESO(s) 26 via a selected interface and provides the ground segment with connectivity to the satellites via feeder link signals. For versatility, each GCS can provide service through two satellites simultaneously while acquiring a third satellite. The major subsystems of each GCS include: a Gateway Antenna and RF (GAR) subsystem 31; a Channel Equipment (CE) subsystem 33; a Ground Station Controller (GSC) subsystem 35; and an Operations and Maintenance Controller (OMC) subsystem 37.

The GAR 31 of each GCS includes all of the RF/IF equipment necessary for supporting up to three antennas 39 per station, with two of the antennas actively tracking two spacecraft, while the third antenna is used to acquire and track another, rising spacecraft. Each antenna preferably has a four-port feed which is capable of transmitting and receiving on both RHC and LHC polarizations, to maximize channel reuse. The IF signals from the GAR are applied to the companion CE 33, which, like a Base Transceiver Station in the GSM architecture, performs several functions, broadly classified as: transceiver; processing; and measurement. The transmit functions of the transceiver could include vocoding, voice activity detection and comfort noise insertion, PN-spreading, channel coding, interleaving and modulation. The data modulation may (but need not) be BPSK, and, if used, a PN spread waveform can be modulated onto the RF carrier using, by way of example only, a QPSK modulation in the forward direction and perhaps OQPSK modulation in the return direction. The receive functions of the transceiver are the opposite of those in the transmitter, i.e., despreading, error decoding and correction, deinterleaving, demodulation, etc. The Channel Equipment may be designed to be in accord with the CDMA air interface definition. The CE processing functions include ephemeris processing and Doppler precompensation, residual Doppler compensation, UT geolocation processing, PN-code generation, signal processing, channel power estimation and control, diversity combining, handover, etc. The measurement functions include Doppler, channel quality, timing measurements and synchronization. The channel equipment also performs signaling functions and will process in-band/sub-band signaling data, both forward and return, for radio resource management.

The GCS Station Controller (GSC) 35 provides functions similar to a GSM Base Station Controller (BSC), and, in addition, also performs unique functions associated with a mobile satellite system. GSC 35 is the access point to the Ground Control Station (GCS) 25 for the Equipment Switching Offices (ESOs) 26. Located logically between the ESO 26 and the GCS's CE 33, the GSC 35 performs switching of the ESO 26 circuits to the CE resources, to allow connectivity of any CE resource to any ESO. The radio resources (satellite channels) allocated to a particular GCS 25-i are centrally managed by the GSC 35-i of that i-th GCS. The GSC receives Resource Allocation Plans (RAP) from the associated Regional Network Control Center 24-i, indicating the satellite resources (frequencies and power) allocated by spot beam for which that GCS 25-i has access. The RAP is generated by the System Coordination Center 23 based on GCS Circuit Requests. The GSC manages the use of radio resources and CE resources in response to call establishment requests, handover requests, call tear down requests, and RAP transitions. GSC 35 also determines if a diversity channel is required at call set-up based on terminal type and resource availability, and commands the CE and the UT with the selected channel assignment, as well as performing in-call management functions to maintain call connection in the presence of dynamic motion of the satellite spot beams. The GSC supports inter-beam and inter-satellite handovers as well as power control and frequency management to account for temporal changes in the spot beam's position relative to the UT and the GCS, and manages the Common Control Channels (CCCHs) for each active spot beam in the GCS. The CCCHs may include at least one each of Paging Channel (PCH), Access Grant Channel (AGCH) and the Broadcast Control Channel (BCCH) in the downlink direction to the user terminals and the Random Access Channel (RACH) in the uplink direction from the user terminals. Each spreading band in each spot beam allocated to the GCS has a set of CCCH channels. The GSC manages the activation of the CCCHs within the CE (the logical identity of the channels will be provided to the CE by the O&M function) and processes the messages associated with the CCCHs. The GSC (OMC) will also support the configuration of the data to be broadcast on the BCCH.

The operations and maintenance functions for each particular GSC 35 are performed by the associated OMC 37 in that GCS 25-i. The OMC also performs the operations and maintenance functions for the CE, whose commands and status are routed through the GSC. The GSC provides processing for the CE proxy agent messages for the real-time CE monitoring. The OMC provides management of CE and GSC objects via an object-oriented interface, and is used to initialize, configure and reconfigure GSC and CE objects, as well as performing fault management and providing the RNCC with performance and status data related to all its managed objects. The OMC also allows an on-line tracing capability. This provides a facility for the collection of data to isolate problems and tune the network accordingly. Tracing can be accomplished on a per subscriber, spot beam or CE basis.

Figure 3:
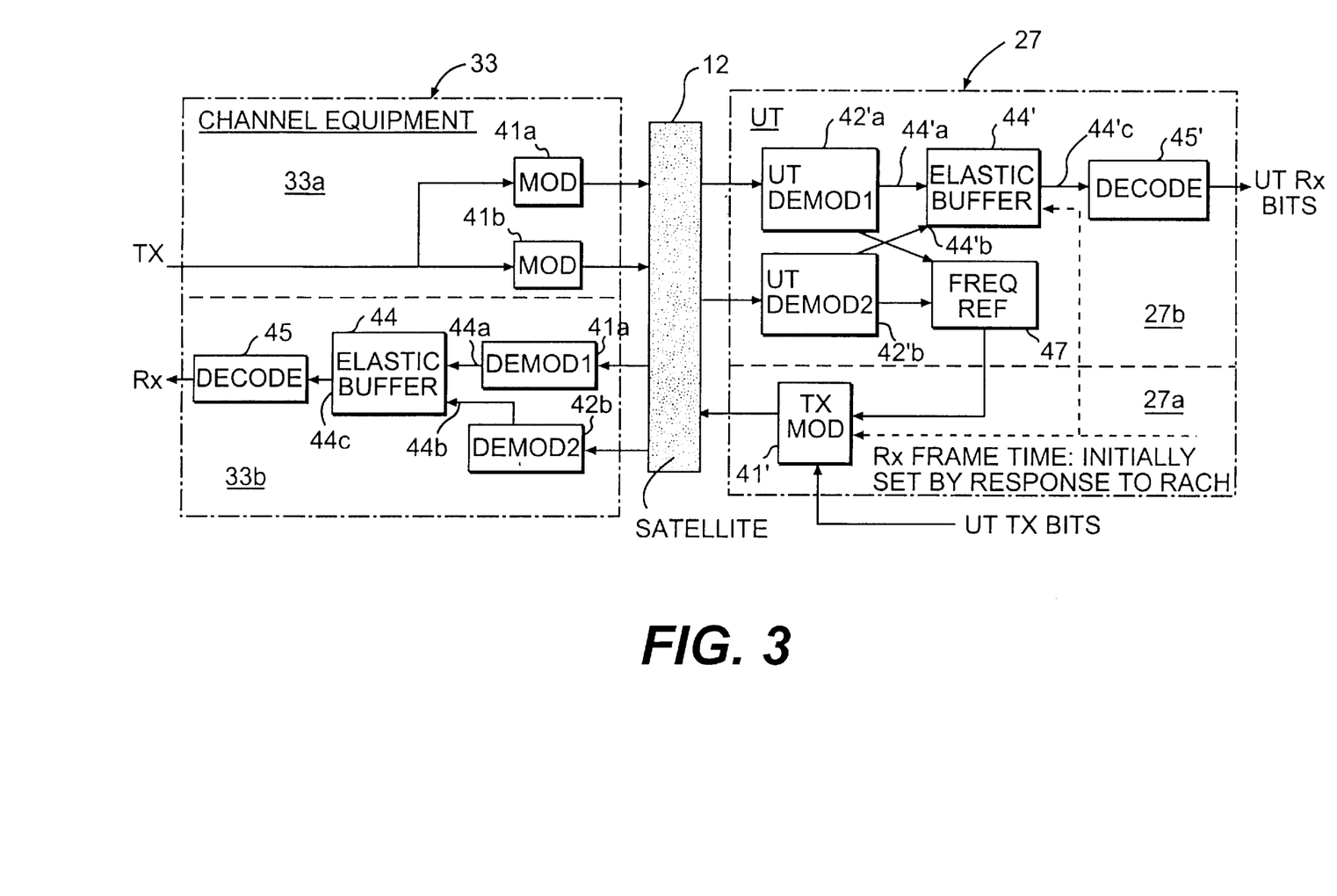
FIG. 3 is a block diagram of the equipment in one of the communications channels of the system, illustrating the placement of the elastic buffers of the present invention.

In accordance with one aspect of the invention, as shown in FIG. 3, the channel equipment (CE) 33 includes a transmitter section 33a with outgoing TX data being applied to a pair of modulators 41a/41b in the uplink path to satellites 12, and a receiver section 33b with a pair of demodulators 42a/42b in the downlink path from satellites 12. The first demodulator 42a applies its undecoded, recovered data output to a first input 44a of an elastic buffer means 44, itself well known to the circuit design arts; the second demodulator 42b output is applied to a second elastic buffer input 44b. The output 44c of the buffer is then decoded by a decoder means 45 to recover the received data Rx stream.

Also in accordance with the invention, each UT 27 has an elastic buffer means 44' in its receive section 27b. The transmitter section 27a has a data modulator means 41', which modulates the UT TX data bit stream onto an RF carrier generated by a frequency reference generator means 47, in accordance with uplink frame timing set initially responsive to RACH. The downlink carriers from the satellites are demodulated by dual demodulation means 42'a/42'b and the outputs thereof are applied to a corresponding one of the elastic buffer 44' inputs 44'a/44'b. the demodulators also provide channel frequency information back to the freq. ref. generator means 47. The elastic buffer means output 44'c is a function of the Rx frame time, and serves to provide a properly acquired data stream to the subsequent decoder means 45', for recovery of the UT Rx data bit stream.

The system 10 employs elastic buffers 44/44' for purposes of synchronizing the arrival times of the incoming signals. By using an elastic buffer, which adds delay to signals with shorter propagation paths, the soft bit decisions are aligned at the appropriate time for decoding. The elastic buffer is located between the Demod blocks and the Decode blocks. The Demod blocks perform all of the demodulation and despreading of the received signals and output soft bit decisions to the Elastic Buffer block. This block provides the appropriate delays to both align the soft decisions corresponding to the same bit on the two channels (for diversity or during hand-off) and to align these soft decisions with the fixed decoding time relative to the transmit frame timing. The Decode block performs the diversity combining of the soft decision when both receive channels are active.

Figure 3A:
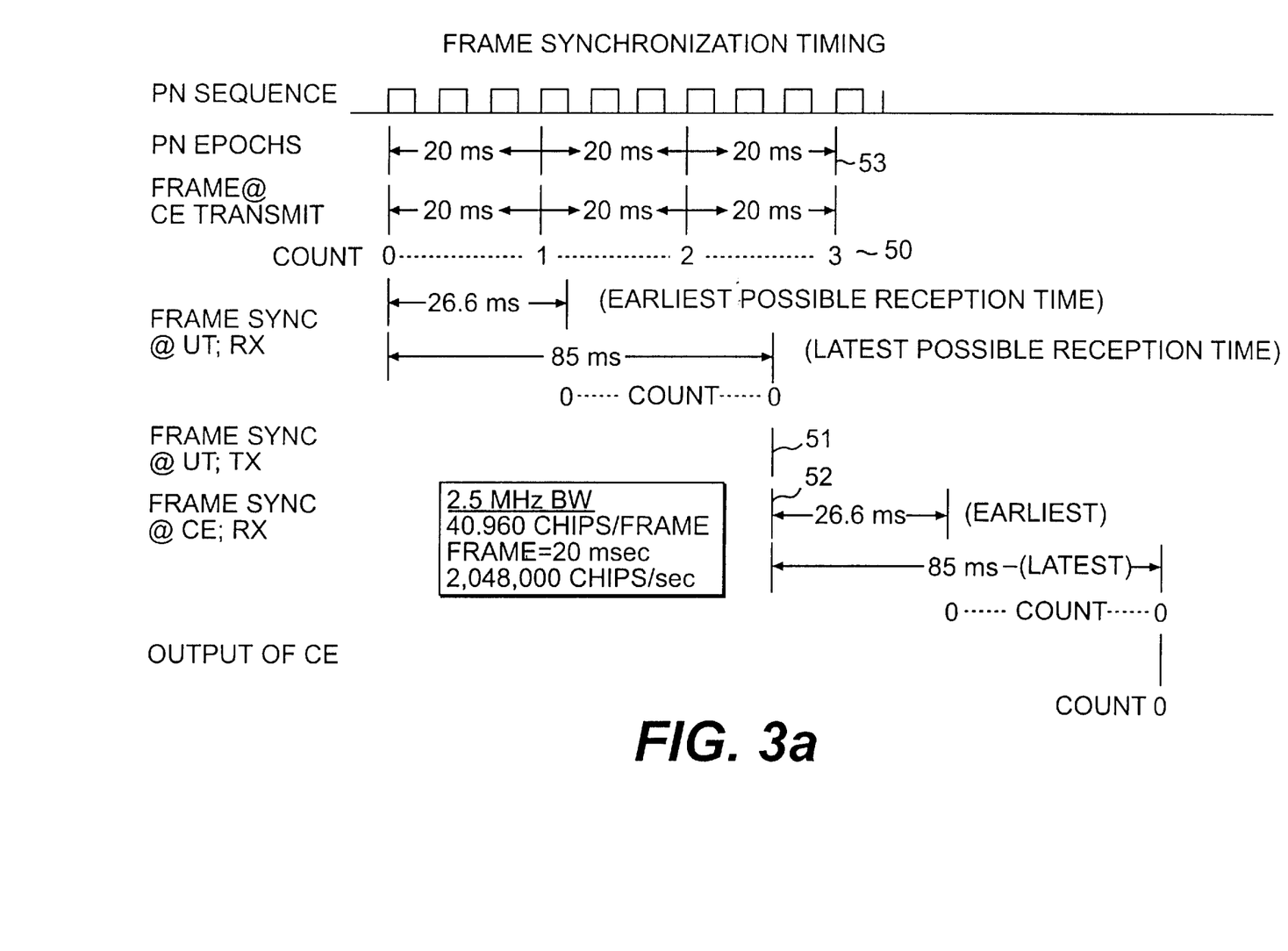
FIG. 3a is a timing diagram for use of the elastic buffers in the channel equipment.

In operation, time synchronization, as illustrated in FIG. 3a, in the system operates to synchronize all of the forward transmissions to any of the satellites using a common time reference. A User Terminal obtains chip, PN code, and frame synchronization using a signal continuously broadcast in a spot beam. To support communication through multiple satellites 12, support handovers, and to provide synchronous data service to UTs 27, the system uses a maximum fixed delay based on the maximum propagation delay for all user transmission through the system. Both GCSs 25 and UTs 27 use elastic buffers 44/44' to achieve this fixed delay. To implement this, a common GCS time reference is used to generate system time in every spot beam, since the GCS measures round trip propagation delay for every user connection to the system. A user accesses the system using a Random Access Channel (RACH). The UT includes the system time (frame count 50) when the UT transmission occurs. For transmission of the RACH, the user's transmitter frame timing is locked to the receiver frame timing with no buffering (i.e. delay) applied. Therefore, the UT transmits the RACH message delayed by the actual one-way propagation delay from the GCS when transmission time is compared to the GCS system time. The GCS measures the time the RACH message is received. From this measurement and the time information contained in the RACH, the GCS calculates the round trip propagation delay from the GCS to the particular user UT 27, and back. The GCS then subtracts the one-way propagation delay from the maximum and sends the one-way difference to that UT 27. At the start of the call, the elastic buffer 44' in that UT is used to delay the demodulated transmission by this now-known one-way difference, prior to decoding. The UT transmitter frame timing 51 remains locked to the decoded receiver frame timing 52. The UT elastic buffer 44' then allows the demodulated bit time to vary because of changes in propagation delay but keeps the decoded bit time constant when compared to system time at the GCS. During handover, when the same GCS transmission is sent through different delay paths (i.e. travels through different satellites 12), that particular UT 27 can combine the demodulated transmissions prior to decoding and maintain the connection without interruption.

During the call, the involved CE 33 monitors the despreading frame time drift in the each of the signals (two during hand-off or diversity) received from each UT with respect to the receive frame time sync. 52. The CE elastic buffer 44 is adjusted to compensate for half of the drift by sending a SACCH message to the UT to command the UT to compensate for the other half of the drift in the UT receive processing elastic delay buffer 44'. The delay in the UT should thus track to the same value as in the CE for the corresponding spot and satellite. Thus half of the change in delay is compensated for by the UT which is required to lock it's transmit frame timing to it's post despreading receive frame timing (after the elastic buffer delays) and half in the CE.

Prior to the handover and after establishing the initial link with the UT, the GSC provides the CE and UT with information on the potential handover spot beams. Once the UT has acquired the new spot beams's broadcast synchronization signal and CE has acquired the UT's signal, the GSC/CE sends the secondary channel definition to the UT on the primary link and commences forward transmission to the UT. Once the UT acquires and tracks the new signal, the UT uses diversity combining of the two signals to enhance the overall received signal, and sends a message to the GCS that it has acquired the secondary link. The GCS commands the UT to switch its timing and frequency reference to the secondary link. The UT then slews its frequency to that of the secondary link at a rate which the CE can track. The UT also begins using secondary link elastic buffer for time tracking. After the transition, the secondary link becomes the primary link. The GSC commands the UT to drop the original primary link.

In the Diversity mode, the GSC may assign an additional spot beam on another satellite for some of the UTs. The acquisition of the second satellite is the same as the initial acquisition of the second spot beam during handover. Once the second receiver is tracking, the GSC commands the CE and UT to perform diversity combining. During diversity handovers, the GSC directs the CE and UT to drop one of the channels and acquire another as described in the Handover Section. Once the handover is complete, the GCS re-engages the diversity combining.

The timing alignment of the PN code epochs 53, and frame synchronization pulses at the UT and CE (both transmit pulse 51 and receive pulse 52) are shown in FIG. 3a. It will be seen that use of elastic buffers 44/44' allows the incoming signals to be synchronized regardless of the variability of the received path lengths.

Figure 4:
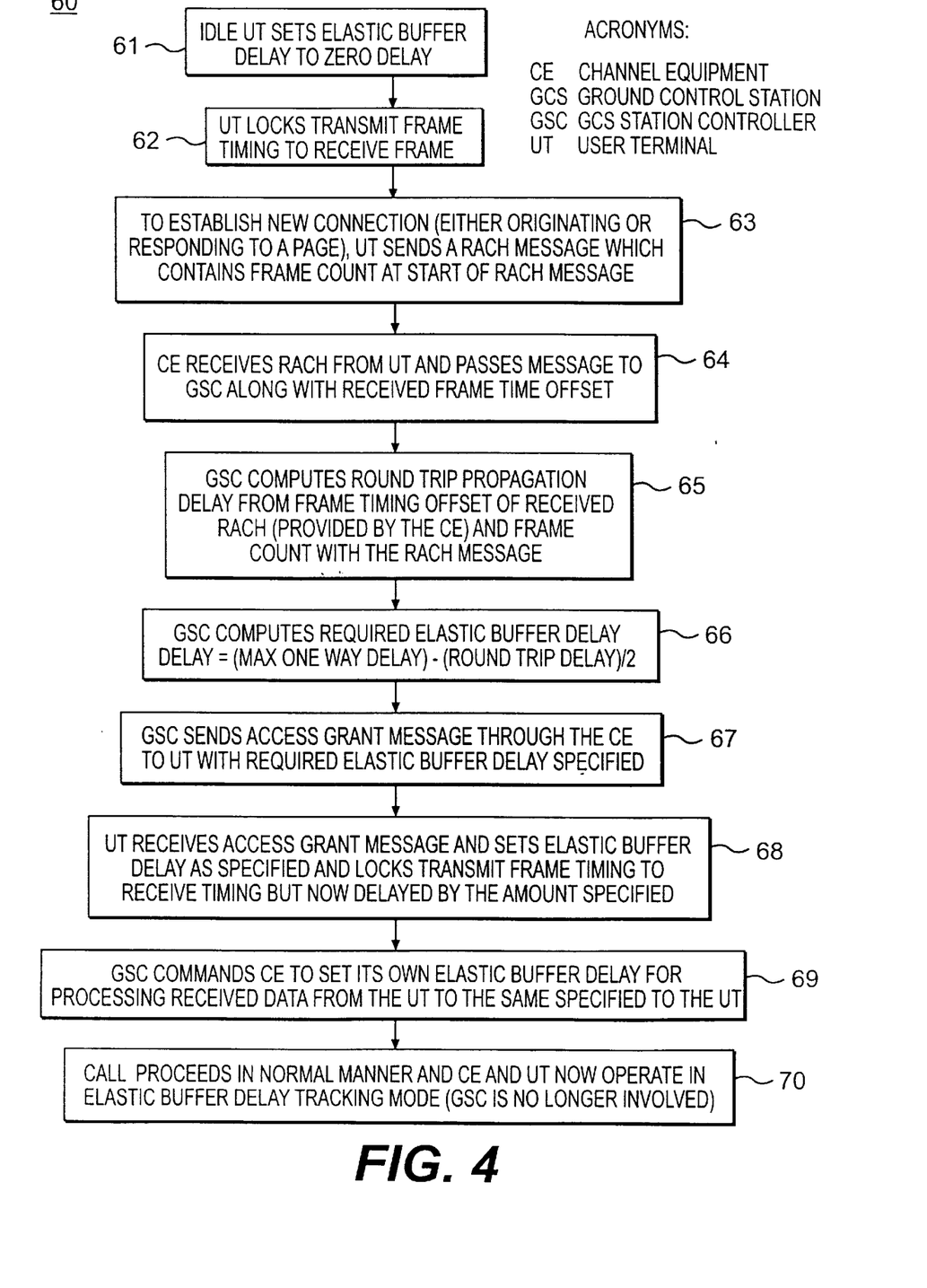
FIG. 4 is a flow diagram of the logical steps necessary for initial implementation of the delay equalization method of the present invention.

Referring now to FIG. 4, the logic sequence 60 of operations to setup the initial elastic buffer delay values in software is shown. Initially, an idle UT 27 sets its elastic buffer 44' to have a zero delay (step 61), until frame timing information is received (step 62) to allow that UT 27 to lock its transmit frame timing. When a new connection is to be established, a RACH message is sent by the UT, with a frame count (step 63); this is received by the CE 33 and the incoming RACH (step 64) is used to provide the received frame time offset to the GSC 35. The GSC computes the total round-trip delay in step 65 and also computes the required elastic buffer delay (step 66) for the involved UT; that required buffer delay information is, in step 67, sent back to the UT with the "access-granted" message. The UT receives this message (step 68) and the companion "specified" elastic buffer delay value, and sets its internal buffer 44' delay, so as to cause the UT transmit frame timing, which is locked to the now-delayed UT receive frame timing, to be offset from the CE 33 transmit frame timing by the maximum one-way propagation delay. The GSC also instructs (step 69) the companion CE 33 to set its own elastic buffer 44 to the calculated CE delay (which is generally the same as the delay time commanded for UT implementation). Once both buffers 44 and 44' are set to the commanded (specified) delays, step 70 is entered, the GSC tasks are no longer involved, and the call proceeds in a normal manner.

Figure 5:
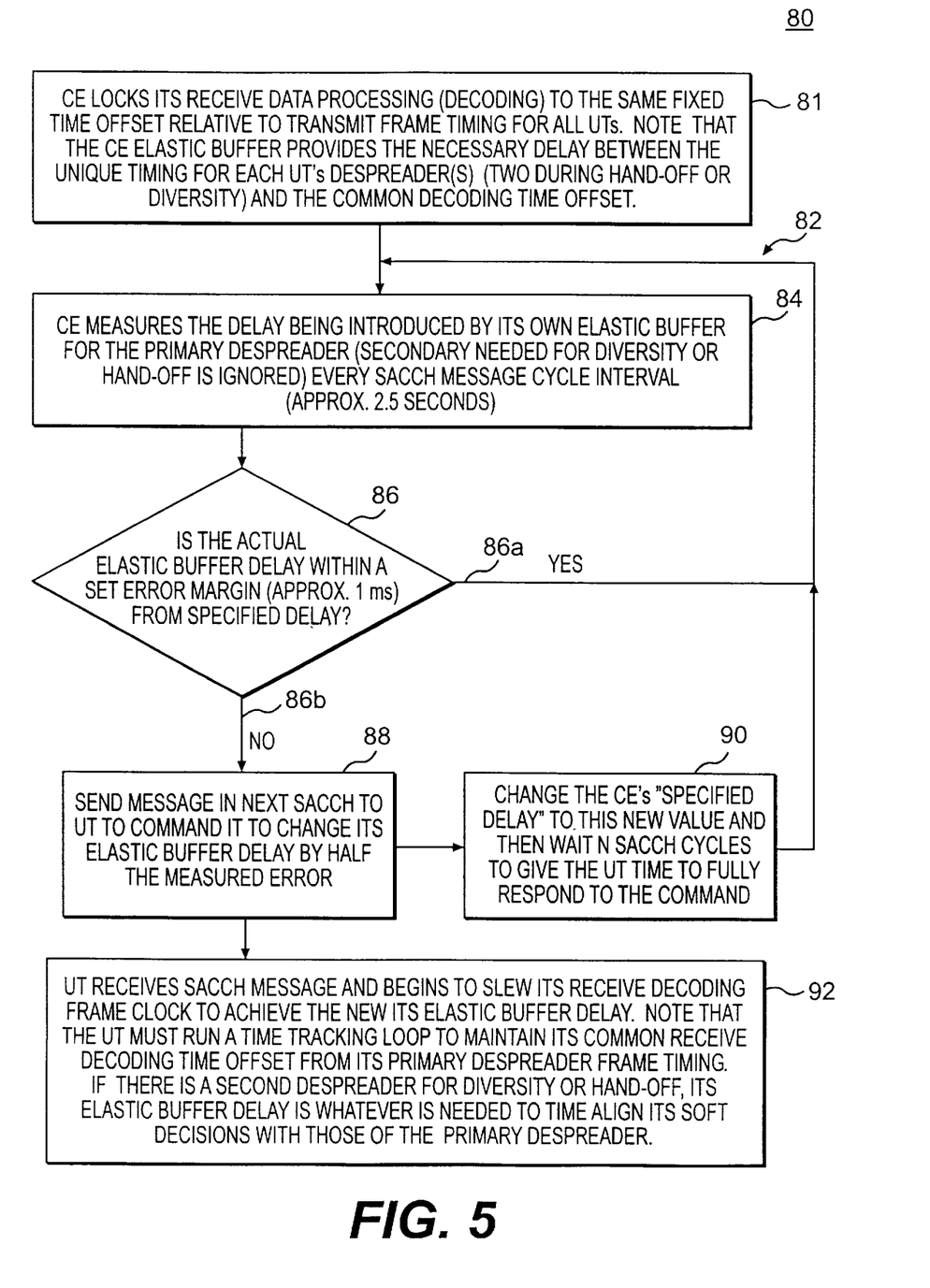
FIG. 5 is a flow diagram of the logical loop implementation of the buffers once communication between two stations is established.

The protocol 80, once the initial delay values have been established in sequence 60, has the CE and UT operate in a closed loop 82, as shown in FIG. 5. In step 81, the CE 33 receive frame timing for the communications channel with the UT is locked to the same fixed delay time (time offset relative to the transmit frame timing pulse) which is used for communicating with all UTs 27 handled by the GCS. The loop 82 starts and channel equipment 33, in step 84, measures the delay time set into its elastic buffer 44, at the occurrence of each SACCH message (e.g. about every 2.5 seconds). The CE logic then enters step 86 and measures the difference between the specified delay and the actual delay in the elastic buffer 44: if this delay difference is within a previously specified margin (e.g. about 1 millisecond) then step exit 86a is taken and the program returns to the top of the loop 82; if the delay difference is greater than the set margin of error, the other step exit 86b is taken and step 88 is entered. In this step, the CE send a message, in the next-occurring SACCH, for the involved UT 27 to change its elastic buffer 44' delay by one-half the measured delay difference. The CE changes its own elastic delay, in step 90, and waits for the UT to change and catch up, before returning to the start of the loop. The UT, in step 92, receives the Change message and slews its buffer delay time toward the commanded value, in open loop manner, so that the CE receives verification of the change only by observing, in step 86, that it has taken place. If there is a second despreader active in the UT for diversity or handoff, the UT must adjust the secondary elastic buffer delay, without assistance from the CE 33, to whatever delay is necessary to time-align the secondary despreader soft decisions with those of the primary despreader. Thus, during a hand-off when there is a commanded switch from the primary to secondary channel by the GSC, the delay that had been required to make the secondary elastic buffer align the secondary channel's soft bit decisions with those of the primary, is used as the new initial "specified" delay. Tracking continues using this formerly secondary channel as the primary channel.

While the present invention has been described with respect to one presently preferred embodiment thereof, many variations and modifications of my novel method for elastic buffer synchronization of received signals in a LEO satellite information transmission system will now become apparent to those skilled in the art. It is my intent, therefore, to be limited only by the scope of the appending claims, and not by way of any details or instrumentalities presented herein by way of description.

What I claim is:

1. A method for fixing a propagation delay between a user terminal station and an other station in a non-synchronous LEO satellite communications system, comprising the steps of:

providing said user terminal station and said other station with an elastic buffer;, establishing for each received signal an initial delay time interval in each elastic buffer commensurate with a maximum expected time delay needed by the station in which that buffer is located;

adjusting the station buffer delay time to cause plural signals received at that station to appear to have substantially similar times-of-arrival.

2. The method of claim 1, wherein the other station is another user terminal station in the system.

3. A method for fixing a propagation delay between a user terminal station and an other station in a non-synchronous LEO satellite communications system serving plural stations, said method comprising the steps of:

providing said user terminal station and said other station with an elastic buffer;

establishing for each received signal an initial delay time interval in each elastic buffer commensurate with a maximum expected time delay needed by the station in which that buffer is located;

adjusting the station buffer delay time to cause plural signals received at that station to appear to have substantially similar times-of-arrival;

wherein the station buffer adjustable delay is set to an amount substantially equal to a time difference between (a) a maximum possible delay for any user served by a system gateway, and (b) a current value of the actual delay to the specific user terminal station.

4. The method of claim 3, wherein the adjustable delay is inserted between soft bit decisions.

5. The method of claim 4, wherein the soft bit decisions are produced by a demodulation and despreading operation in a receiver of the user station.

6. The method of claim 5, wherein the adjustable delay is inserted before an error-correction-decoding operation.

7. The method of claim 3, wherein the adjusted delay time in each elastic buffer is a function of reception frame timing.

8. The method of claim 3, wherein, responsive to receipt of an initial message, the user station transmits an actual one-way propagation delay timing signal back through the system.

9. The method of claim 3, wherein each station establishes an initial delay timing value at the inception of each call.

10. The method of claim 3, wherein one station monitors a despreading frame time drift and causes both stations to adjust their elastic delay buffers by about one-half of the monitored time drift.

11. A method for fixing a propagation delay between a user terminal station and an other station in a non-synchronous LEO satellite communications system, comprising the steps of:

providing each user terminal station and each other station with an elastic buffer;

inserting, by use of the elastic buffer, a variable time delay in each signal received by each station; and adjusting the elastic buffer time delays for plural signals to have substantially similar times-of-arrival, so as to cause a fixed transmission time for each data or vocoder bit, from the time that bit enters the transmit modulation process until the time that same data or vocoder bit is output from the receiving station.

12. The method of claim 11, wherein the other station is another user terminal station in the system.

13. The method of claim 11, wherein the station buffer adjustable delay is set to an amount substantially equal to a time difference between (a) a maximum possible delay for any user served by a system gateway, and (b) a current value of the actual delay to the specific user terminal station.

14. The method of claim 13, wherein the adjustable delay is inserted between soft bit decisions.

15. The method of claim 14, wherein the soft bit decisions are produced by a demodulation and despreading operation in a receiver of the user station.

16. The method of claim 15, wherein the adjustable delay is inserted before an error-correction-decoding operation.

17. The method of claim 11, wherein the adjusted delay time in each elastic buffer is a function of reception frame timing.

18. The method of claim 11, wherein, responsive to receipt of an initial message, the user station transmits an actual one-way propagation delay timing signal back through the system.

19. The method of claim 11, wherein each station establishes an initial delay timing value at the inception of each call.

20. The method of claim 11, wherein one station monitors a despreading frame time drift and causes both stations to adjust their elastic delay buffers by about one-half of the monitored time drift.

* * * * *